July 14, 1931.                V. J. CHRISTIE                1,814,293
                            AUTO VISION CURTAIN
                            Filed March 21, 1930
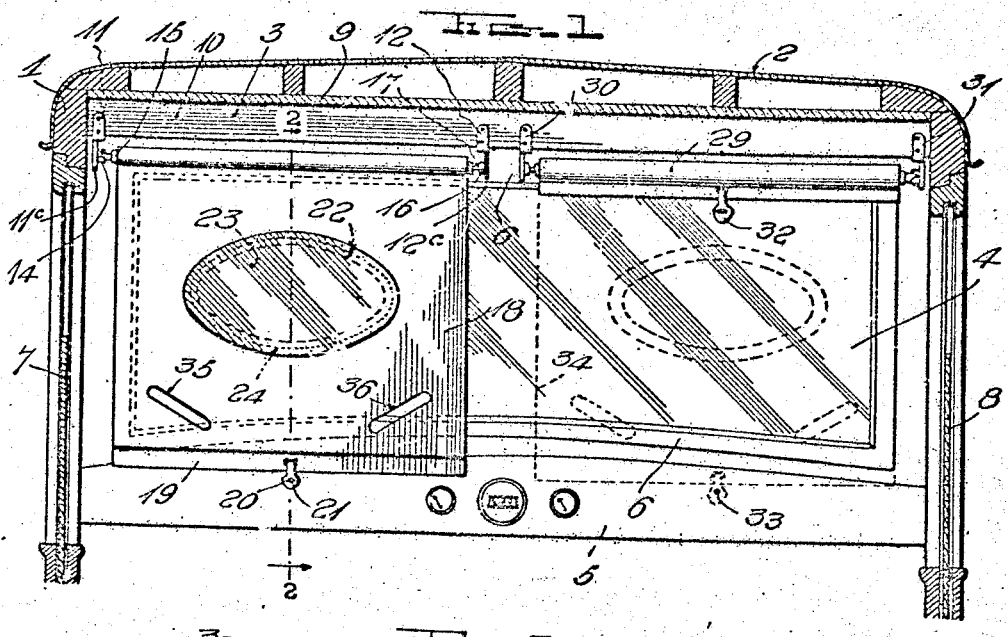
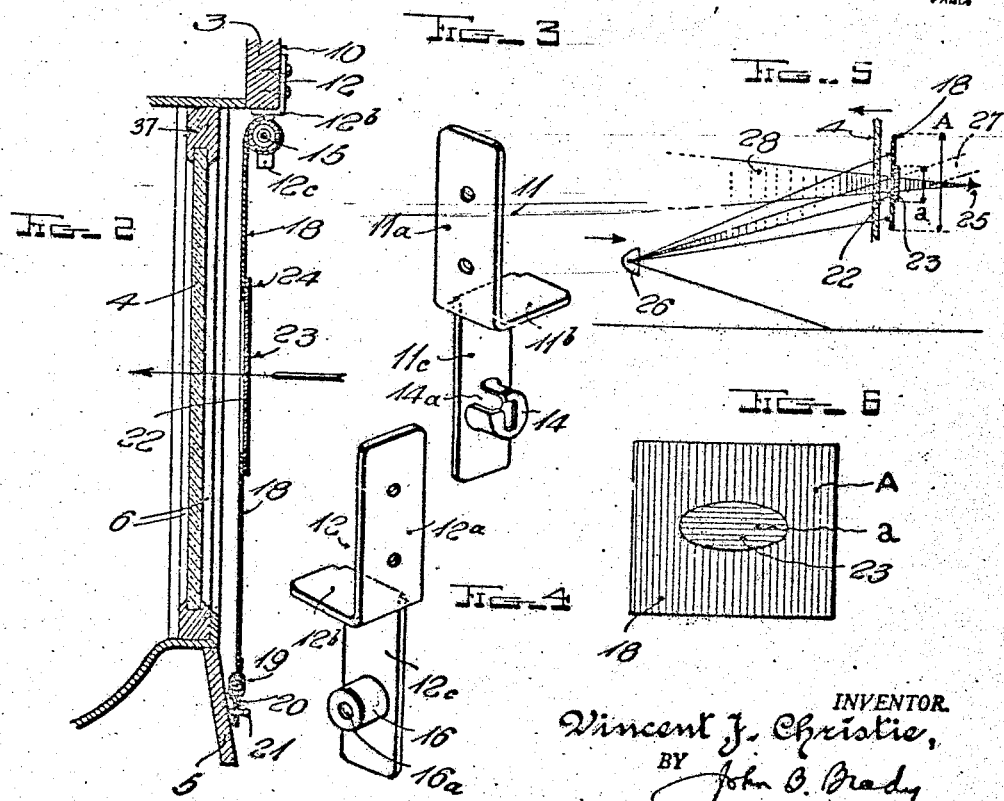
INVENTOR
Vincent J. Christie,
BY John B. Brady
ATTORNEY Patented July 14, 1931

1,814,293

UNITED STATES PATENT OFFICE

VINCENT J. CHRISTIE, OF SCENIC, SOUTH DAKOTA

AUTO-VISION CURTAIN

Application filed March 21, 1930. Serial No. 437,873.

My invention relates broadly to motor vehicles and more particularly to an anti-glare attachment for motor vehicles.

One of the objects of my invention is to provide a constructon of adjustable curtain which may be readily mounted adjacent the windshield of various makes of automobiles for screening the eyes of the driver and occupants in the car against excessive glare.

Another object of my invention is to provide a construction of adjustable curtain adapted to be mounted adjacent the windshield of motor vehicles, the curtain having an opaque portion and a semi-transparent portion for providing the required vision of the roadway for driving while preventing injurious glare from the headlights of approaching vehicles.

Still another object of my invention is to provide a construction of bracket system for mounting an adjustable curtain adjacent the windshield of an automobile to enable the curtain to be readily applied to various constructions of motor vehicles.

A still further object of my invention is to provide an adjustable curtain for attachment adjacent the windshield of a motor vehicle in which the curtain has an opaque portion and a semi-transparent portion disposed centrally of the opaque portion, the semi-transparent portion bearing a particular ratio in area to the area of the opaque portion of not less than 1 to 6.28.

Other and further objects of my invention will be understood from the specification hereinafter following by reference to the accompanying drawings, in which:

Figure 1 is a transverse vertical section through a motor vehicle looking in the direction of the windshield showing one of the curtains in extended position and the other of the curtains in retracted position; Fig. 2 is a cross-sectional view taken on line 2—2 of Fig. 1; Fig. 3 is a perspective view of one of the bracket members for supporting one end of the roller of the auto-vision curtain; Fig. 4 is a perspective view of the coacting bracket which supports the auto-vision curtain; Fig. 5 is a theoretical view explaining the operation of the auto-vision curtain of my invention; and Fig. 6 is an elevational view showing the relative areas of the opaque and semi-transparent portions of the auto-vision curtain.

Heretofore in the art, various types of anti-glare devices have been proposed for motor vehicles but such devices have proven impractical in that they have not been readily attachable to various makes of cars, and sufficient glare has not been eliminated to enable the driver to concentrate upon a safe driving course without distraction from glaring headlights of approaching cars. I have devised an auto-vision curtain which may be readily mounted adjacent the windshield of a motor vehicle by means of brackets which are attachable to the inside frame of all makes of cars for centering the auto-vision curtain directly before the driver and directly in front of the occupant of the seat adjacent the driver. The auto-vision curtain of my invention is constructed of opaque material having a central aperture therein of a size which is selected with particular care. I have found for best results in small cars that there should be a ratio of area between the opaque portion of the curtain and the central aperture therein of not less than 1 to 6.28. That is, the area of the opaque portion of the curtain should not be less than 6.28 times the area of the aperture in the curtain. The aperture in the curtain is closed by a semi-transparent sheet of flexible material. I have successfully used for this purpose material known as "kodaloid" which is colored to soften the effect of glare. That is to say, the flexible material which extends over the central aperture has the property of diffusing light rays which may tend to interfere with the vision of the driver where the rays penetrate the aperture through the opaque curtain. The kodaloid material is sufficiently flexible to enable the material to be readily rolled with the opaque portion of the curtain when the curtain is retracted. I may also provide ventilating openings in parts of the curtain to permit circulation of air when the windshield is open, the area of the ventilating openings being such as not to admit interfering glare to any detrimental extent.

Referring to the drawings in detail reference character 1 designates the frame of the motor vehicle having the roof portion 2 and the laterally extending frame member 3 directly over the windshield 4. The windshield has been shown located above the instrument panel 5. The windshield is supported in a frame 6 which may be open with respect to the front of the car while driving in fair weather or closed during inclement or cold weather. The side windows in the doors of the car are shown at 7 and 8. The upper portion of the frame member 3 of various makes of cars is generally sheathed with metal which I have designated at 9 making it impractical to secure any form of bracket mounting thereto. The frame member 3, however, is generally of wood enabling screws to be passed through the front surface 10 of the frame member and to be embedded in the frame member for securing bracket members 11 and 12 in position.

In Fig. 3, I have shown the construction of the bracket member 11 consisting of an upwardly extending plate 11a, a plate portion disposed normally thereto as shown at 11b, and a plate portion 11c disposed normally to the plate portion 11b. The several plate portions 11a, 11b and 11c are integral and there is attached to the plate portion 11c the pintle receiving device 14. The pintle receiving device 14 is slotted at one side thereof as represented at 14a for receiving the rectangular pintle of the roller 15. The coacting bracket 12 consists of an upwardly extending plate member 12a, a horizontally extending plate member 12b, and a depending plate member 12c. The depending plate member 12c carries the pintle receiving member 16 apertured at 16a to receive the cylindrical pintle 17 on the end of the roller 15. It will be observed that the coacting brackets are constructed in right and left hand forms and serve to support the pintle receiving members 14 and 16 of such construction that the roller 15 may be readily inserted in or removed from the brackets. The roller 15 carries the opaque curtain 18 having an edging 19 at the edge thereof and a securing tongue 20 secured to the edging 19 and adapted to be hooked over the end 21 on the instrument panel 5 for securing the curtain 18 in extended position. The curtain 18 is so mounted that it covers the area of the windshield immediately in front of the driver and excludes by reason of its opaque properties the undesired glare receivable from the headlights of approaching motor vehicles. The center of the curtain is apertured as indicated at 22 preferably in the shape of an ellipse. The aperture 22 is covered by the sheet of kodaloid 23 sewed or otherwise secured at its periphery as represented at 24. The kodaloid is colored to eliminate the effects of glare on the vision from approaching headlights and yet allow ample vision to permit safe driving. I have found that objectionable rays may be eliminated while permitting clear vision for driving when a proportion of areas between the opaque area 18 and the semi-transparent area 23 is selected in a ratio of not less than 1 to 6.28.

Fig. 5 is a theoretical view illustrating the relation of the windshield 4 and the curtain 18 to the point of vision or eye 25 of the driver. The aperture 22 in the opaque curtain 18 has been designated as being covered by means of the semi-transparent window 23. The interfering source of glare has been designated generally at 26 representing an approaching motor vehicle. The rays of light from the source of glare 26 sweep substantially the entire area of the windshield 4 and strike the opaque surface 18 and are prevented from directly reaching the eye of the driver 25. The rays designated within the area 27 which do pass the semi-transparent window 23 have no detrimental influence upon the driver as the rays are softened by the kodaloid material 23. The vision of the driver with respect to the roadway is clear through the entire zone 28 while the driver is protected by the opaque curtain 18 from excessive glare which is so often a menace to safety. Many accidents are recorded due to the temporary blinding of the driver by the excessive glare from the headlights of approaching vehicles.

In Fig. 6, I have shown the opaque curtain 18 designated by an area A. The semi-transparent window 23 which is located substantially in a central position with respect to curtain 18 has been designated as having an area $a$. In a preferred construction of my invention the size of curtain 18 is fifteen inches in length by nineteen inches in width. The size of the elliptical aperture which is substantially in the center of the curtain 18 is ten and one-half inches along its major axis and five and one-half inches along its minor axis. It will be observed by computing the ratio of the areas of the curtain 18 to the area of the central aperture therein that:

The area of the central ellipse is $\pi ab$ where:

$a = \frac{1}{2}$ the length of the major axis;
$b = \frac{1}{2}$ the length of the minor axis; and
$\pi = 3.1416$.

Substituting the values of sizes in the above equation the area $a$ is:
$3.1416 \times 2.75 \times 5.25 = 45.36$ square inches.
The area A of curtain 18 is:
$15 \times 19 = 285$ square inches.

Therefore, $\frac{A}{a} = \frac{285}{45.36} = 6.28$.

I have found that any further decrease in the area of the aperture in the center of the curtain impairs the vision of the driver but that substantial enlargement of the aperture detracts from the anti-glare properties of the device. That is to say, a complete roller of semi-transparent material located before the driver does not accomplish the object of my invention, as excessive light is still received from approaching vehicles. By providing a proper area of opaque material in the curtain 18 serving as a frame for the semi-transparent central aperture, I have obtained a result in which sufficient vision is secured for the purpose of driving while eliminating the effects of detrimental glare.

For the comfort of the occupant of the seat adjacent the driver, I provide a second roller designated at 29 mounted on brackets 30 and 31 in a position centrally located before the occupant of the seat adjacent the driver. A tongue 32 is employed for the purpose of latching the curtain 29 in extended position on suitable pin 33 which may be carried upon instrument panel 5. The curtain 29 is shown in rolled position in Fig. 1, the extended position thereof being indicated by dotted line 34. A flexible window corresponding to the kodaloid window of the curtain 18 is also provided in curtain 29 for providing sufficient vision of the roadway while eliminating undesired glare. When the windshield 4 is opened by the pivotal movement of frame 6 outwardly around the pivot or hinge 37, I prevent detrimental effects upon the curtain under conditions of wind pressure by providing ventilating openings 35 and 36 in the curtain as illustrated.

The auto-vision curtain of my invention may also be mounted adjacent the side windows 7 and 8 of the car where conditions of driving may so warrent.

I have found the device of my invention particularly useful in shading the eyes of the driver against the glare of the sunlight and snow reflections which become so monotonous after continued driving. From my experiences of many hours of driving in the sunlight and in the glare of the snow, the dazzling light upon the eyes has been extremely irritating. In driving considerable distances against the rising or setting sun, the dazzling effects are such as to blind the driver, and yet with the protection of the device of my invention I have found that such glaring effects are softened as to become bearable even over long periods of driving.

The combination of the opaque and the semi-transparent portions of the curtain serve to protect the driver and occupants against the rays of the sun and reflected rays from dazzling snow especially as the sun is in a position rising above or sinking below the apparent horizon.

The auto-vision curtain of my invention has been found to be extremely simple in its construction and practical and successful in use, and while I have described a preferred embodiment of my invention, I desire that it be understood that modifications may be made and that no limitations upon my invention are intended other than are imposed by the scope of the appended claim.

What I claim as new and desire to secure by Letters Patent of the United States is as follows:

An auto-vision curtain comprising a roller adapted to be mounted adjacent the hingedly mounted windshield of a motor vehicle, and an opaque curtain carried by said roller and adapted to be extended laterally of said windshield before the driver's seat on the interior side thereof remote from the direction of movement of the windshield, said curtain having an aperture disposed centrally therein, semi-transparent material covering the aperture in said curtain and softening the effect of light rays which penetrate the aperture in said curtain, the opaque material in said curtain operating to exclude undesired glare upon the driver of the motor vehicle, the opaque portion of said curtain having angularly disposed slots extending in opposite directions in opposite corners thereof below said semi-transparent material for reducing the effects of wind pressure against said curtain when said hingedly mounted windshield is opened, whereby the semi-transparent material in said curtain may be maintained in stretched position independently of the pressure of the wind against said curtain.

In testimony whereof I affix my signature.

VINCENT J. CHRISTIE.